United States Patent [19]

Nieskens et al.

[11] Patent Number: 4,673,557

[45] Date of Patent: Jun. 16, 1987

[54] PROCESS FOR REMOVING HYDROGEN SULFIDE FROM GASES

[75] Inventors: Martin J. P. C. Nieskens; Ramalinga Ramamurthy, both of Amsterdam, Netherlands

[73] Assignee: Shell Oil Company, Houston, Tex.

[21] Appl. No.: 716,266

[22] Filed: Mar. 26, 1985

[30] Foreign Application Priority Data

Mar. 27, 1984 [GB] United Kingdom ............... 8407842

[51] Int. Cl.$^4$ ..................... C01B 17/16; C01B 31/20
[52] U.S. Cl. .................................................. 423/230
[58] Field of Search ............................ 423/230; 55/73

[56] References Cited

U.S. PATENT DOCUMENTS

| | | | |
|---|---|---|---|
| 3,078,640 | 2/1963 | Milton | 55/73 |
| 3,363,401 | 1/1968 | Jean-Pierre et al. | 423/230 |
| 4,088,736 | 5/1978 | Courty | 423/230 |
| 4,358,297 | 11/1982 | Eberly | 423/230 |
| 4,363,790 | 12/1982 | Anderson et al. | 423/230 |
| 4,371,507 | 2/1983 | Farha et al. | 423/230 |
| 4,455,286 | 6/1984 | Young et al. | 423/230 |

FOREIGN PATENT DOCUMENTS 873505 5/1979 Belgium .

*Primary Examiner*—Gregory A. Heller

[57] ABSTRACT

A process for removing $H_2S$ from gases is described, the process comprising contacting a $H_2S$-containing gas with a solid absorbent comprising an intimate mixture of zinc oxide and a zeolite having a pore size larger than 0.40 nm, at a temperature above 300° C. The absorbent is regenerated by passing an oxygen-containing gas over the absorbent at a temperature above 400° C. Suitable compositions for carrying out the process are disclosed.

10 Claims, No Drawings

4,673,557

PROCESS FOR REMOVING HYDROGEN SULFIDE FROM GASES

BACKGROUND OF THE INVENTION

The invention relates to a process for removing hydrogen sulfide from various "sour" industrial gases, and more particularly to such a process in which hydrogen sulfide is absorbed with a solid metal oxide absorbent. The invention further relates to an absorbent for use in such a process.

Hydrogen sulfide ($H_2S$)-containing gases become available in many industrial processes, such as oil refinery processes and coke-oven gas processes. Gases containing $H_2S$ are, for example, the off-gases from a Claus reaction or unit, synthesis gases, natural gas, hydrocarbon process gases, such as hydrocarbon feeds for steam-reforming, hydrogen production, or production of synthesis gas by controlled oxidation.

Well known processes for removing $H_2S$ from gas include wet processes in which a liquid absorbent, such as an alkanolamine solution, is used. Such wet processes are normally operated at temperatures between about 30° C. and 50° C. $H_2S$-containing gas usually contains water vapor as a major constituent. Wet $H_2S$ removal processes require cooling of the gas, which causes the water vapor present in the gas to condense. This condensation implies a non-recoverable loss of heat, which in its turn results in a loss of thermal efficiency of the wet absorption processes. The loss of water in the gas is particularly regrettable, in the case of production of hydrogen or hydrogen-enriched synthesis gas, since a substantial amount of steam, obtained by water quenching of the gas, might be used in the downstream CO-shift section. If a synthesis gas process is integrated with a combined cycle power generation in a power station, the efficiency of the power station might be increased by increasing the temperature at which the $H_2S$ removal is carried out.

To overcome the above disadvantages encountered with liquid absorbent systems, it has already been proposed to use oxides or hydroxides of metals for removing sulfur compounds from gases. Since these oxides are solid, the sulfur removal can take place at a much higher temperature than when using liquid adsorbents. Metal oxide absorbents may be used for $H_2S$ removal at temperatures of 300° C. up to 600° C. It has already been proposed to use zinc oxide for selectively absorbing $H_2S$ at a temperature of from about 300°–400° C. The known absorbents based on zinc oxide, however, do not meet the requirements of high absorption capacity and high absorption velocity for $H_2S$, and do not possess the capability of frequent regeneration without a substantial impairment of the absorption capacity. To improve the absorption capacity, it has already been proposed to combine the zinc oxide with a suitable carrier material, such as silicon dioxide. It has, however, been found that such an addition of a carrier material has an adverse influence on the regenerability of spent absorbent.

It is an object of the present invention to provide a process for the removal of $H_2S$ from gases, in which an absorbent based on zinc oxide is used which has superior absorption properties and good regeneration properties.

SUMMARY OF THE INVENTION

Accordingly, the invention relates to a process for removing hydrogen sulfide from sour gaseous streams, the process comprising contacting the hydrogen sulfide-containing stream with a solid absorbent comprising an intimate mixture of zinc oxide and a zeolite having a pore size larger than 0.40 nm, at a temperature above 300° C. The term "pore size" is employed as defined in "Zeolite Molecular Sieves", Structure, Chemistry, and Use, by Donald W. Breck, John Wiley and Sons (1974), pp. 633–635. The spent absorbent is regenerated by passing an oxygen-containing gas over the spent absorbent at a temperature above 400° C.

The zeolite for use in the absorbent may be a synthetic or a naturally-occurring zeolite. Any zeolite having a pore size larger than 0.40 nm may be suitably used for practicing the invention. Preferred are zeolites having a pore size of at least 0.5 nm, especially those having pore sizes ranging from 0.5 nm to 1.3 nm.

Examples of suitable zeolites for use in the process of the invention are zeolites of the faujasite group (particularly those which contain sodium and calcium cations), such as zeolite X and Y, and the calcium-exchanged forms of zeolite A, which is termed mol 5A. Other examples of suitable zeolites are those of the chabazite group, for example chabazite, gmelinite and erionite.

The zinc oxide and the zeolite may be used in a weight ratio which is not critical and which may vary within wide ranges. Since the zinc oxide forms the most active part for absorption in the absorbents, it is preferred to apply absorbents containing more than 50% by weight of zinc oxide.

To promote acceptance of $H_2S$ by the absorbent, the absorption temperature is preferably at least 400° C. and, more preferably, between 500° C. and 550° C.

After a suitable time of operation, the absorbent, now "spent", is regenerated. Preferably, the regeneration is carried out at a temperature above 500° C. The regeneration step is preferably carried out by passing a gas mixture containing a minor quantity of free oxygen over the spent absorbent. This gas mixture is suitably prepared by diluting air with an inert gas, such as nitrogen.

DETAILED DESCRIPTION OF THE INVENTION

The particular type of sour gaseous stream treated is not critical, as will be evident to those skilled in the art. Streams particularly suited to removal of $H_2S$ by the practice of the invention are, as indicated, naturally-occurring gases, synthesis gases, process gases, and fuel gases produced by gasification procedures, e.g., gases produced by the gasification of coal, petroleum, shale, tar sands, etc. Particularly preferred are coal gasification streams, natural gas streams, and refinery feedstocks composed of gaseous hydrocarbon streams, especially those streams of this type having a low ratio of $H_2S$ to $CO_2$, and other gaseous hydrocarbon streams. The term "hydrocarbon stream(s)", as employed herein, is intended to include streams containing significant quantities of hydrocarbon (paraffinic, naphthenic, and aromatic), it being recognized that such streams contain significant "impurities" not technically defined as a hydrocarbon. Again, streams containing principally a single hydrocarbon, e.g., ethane, are eminently suited to the practice of the invention. Streams derived from the gasification and/or partial oxidation of gaseous or liquid hydrocarbon may be treated by the invention.

The H₂S content of the type of streams contemplated will vary extensively, but, in general, will range from about 0.1 percent to about 10 percent by volume or greater. Obviously, the amount of $H_2S$ present is not generally a limiting factor in the practice of the invention.

According to a very attractive embodiment of the present invention, an absorbent is used which has been prepared by the following process steps: pulverizing and intimately mixing zinc hydroxide particles and zeolite particles, pelletizing the so formed mixture of zinc hydroxide and zeolite to form particles of homogeneously mixed zinc hydroxide and zeolite, and calcining the so formed particles to bring the particles in their active form for absorbing $H_2S$. The calcination is preferably carried out at a temperature of at least about 400° C. and for a period of about 1 hour.

The so-formed absorbent particles may be used according to the invention in any convenient physical form, for example, as a powder, flakes, spheres or pellets. It should be noted that the size of the pellets is not an essential feature for the process of the invention. The pellets may further have any suitable shape, such as oblong or spherical. Very good results have been obtained with pellets. The average size of the zinc oxide particles and the zeolite particles is preferably chosen within the range of about 1 to about 5 micrometers. The absorbent for use in the process of the invention may further comprise one or more oxides of other metals, preferably chosen from those of copper, cadmium, titanium, zirconium, vanadium, chromium, molybdenum, tungsten, manganese, iron, cobalt and nickel. These oxides, also called promoters, have a favorable influence, in particular on the regeneration of spent absorbent. Such a promoter may be added to the zinc oxide and zeolite mass according to any method known in the art, such as, for example, impregnation on the absorbent, or addition of such an oxide in pulverized form to the ballmixing step in the preparation of the absorbent. The absorbent of the invention may be used in that process described in British Patent application No. 8407843, filed Mar. 27, 1984, entitled "PROCESS FOR THE REMOVAL OF SULFUR COMPOUNDS FROM OFF-GASES".

The process according to the invention is preferably carried out in at least two reactors which contain absorbent. The regeneration of spent absorbent is preferably carried out in each reactor in turn. Preferably, the regeneration step is carried out periodically, even if the efficiency has not decreased to an unacceptable level, in order to keep the efficiency of the absorption step at a high level at all times.

The invention further provides an absorbent which comprises an intimate mixture of zinc oxide and a zeolite having a pore size larger than 0.40 nm.

The invention will now be explained with reference to the following illustrations.

Two absorbents consisting of zinc oxide and a zeolite having a pore size larger than 0.40 nm were compared in absorption and regeneration behavior with an absorbent consisting of pure ZnO, an absorbent consisting of zinc oxide and a zeolite having a pore size of 0.40 nm, and with four absorbents consisting of zinc oxide and a solid material other than a zeolite.

The absorbents consisting of zinc oxide and a zeolite were prepared in the following manner. Particles of zinc hydroxide and particles of commercially available zeolites, as identified hereafter, were mechanically pulverized and intensively mixed with one another in a ballmilling device. The particles were ground to an average particle size of between about 1 and about 5 micrometers. The mixture of zinc hydroxide and zeolite formed was made into pellets having an average size of between 0.2 and 0.6 mm, and the pellets were heated at a temperature of about 400° C. for a period of about 1 hour to bring the pellets into their active form required for operating as an $H_2S$-absorbent mass.

The absorbent consisting of pure zinc oxide was prepared in the following manner. Ammonia was added to a solution of zinc nitrate in water to cause precipitation of zinc hydroxide. The zinc hydroxide was filtered, washed with water until nitrate could no longer be detected in the filtrate, and dried at a temperature of about 120° C. The dried zinc hydroxide particles were mechanically ground and formed into pellets having an average size of between 0.2 to 0.6 mm. The pellets were finally calcined at a temperature of about 400° C. in order to bring them into their active form.

For measuring the absorption behavior of the absorbents, 10 ml of the absorbent to be tested was introduced into a vessel and a gas stream comprising nitrogen, $H_2S$ and water vapor was passed through the vessel at atmospheric pressure and at a space velocity of about 5500 $Nm^3/(m^3)(h)$ until breakthrough occurred. Breakthrough was analyzed by catalytically oxidizing the off-gas over an incinerator catalyst at a temperature of about 400° C. and passing the treated gas through a solution of 1% by weight of $H_2O_2$. The $H_2SO_4$ thus formed was detected by continuous measurement of the conductivity of the $H_2O_2$ solution. Regeneration of spent absorbent was performed by passing a gas stream comprising a minor portion of oxygen through the vessel. During regeneration, the temperature in the vessel was maintained at about 570° C. The results of the absorption and regeneration tests carried out are summarized in the following Table, giving the absorption capacity for each of the absorbents after 10 cycles of absorption and regeneration. In this table, the examples tested have been indicated with 1 and 2 and the comparative experiments with A through F.

TABLE

| Example; comparative experiment | Absorbent | bulk density kg/m³ | load at breakthrough | | | Regeneration | |
|---|---|---|---|---|---|---|---|
| | | | mol H₂S per mol ZnO | g S per 100 g absorbent | kg S per m³ absorbent | rate kmolS/m³h | $t_{acc.}/t_{reg.}$ |
| A | pure ZnO | 1690 | 0.37 | 14.5 | 247 | 0.6* | 0.4 |
| B | 75 pbw ZnO/ 25 pbw mol 4A | 1180 | 0.58 | 17.2 | 203 | 0.6* | 0.35 |
| 1 | 75 pbw ZnO/ 25 pbw mol 5A | 1160 | 0.53 | 15.7 | 182 | 1.0** | 0.6 |
| 2 | 75 pbw ZnO/ 25 pbw zeolite X | 1140 | 0.82 | 24.3 | 277 | 1.0** | 0.6 |
| C | 75 pbw ZnO/ 25 pbw SiO₂ | 1050 | 0.50 | 14.8 | 156 | 1.0* | 0.6 |
| D | 75 pbw ZnO/ | 740 | 0.55 | 16.3 | 121 | 0.25* | 0.25 |

TABLE-continued

| Example; comparative experiment | Absorbent | bulk density kg/m$^3$ | load at breakthrough mol H$_2$S per mol ZnO | load at breakthrough g S per 100 g absorbent | kg S per m$^3$ absorbent | Regeneration rate kmolS/m$^3$h | $t_{acc.}/t_{reg.}$ |
|---|---|---|---|---|---|---|---|
| E | 25 pbw Al$_2$O$_3$ 75 pbw ZnO/ 25 pbw kieselguhr | 920 | 0.50 | 14.8 | 136 | 0.55* | 0.3 |
| F | ZnO/silicate | 940 | 0.53 | 15.7 | 148 | <0.2* | <0.1 |

*Regeneration with gas comprising 68% by volume nitrogen, 18% by volume oxygen and 14% by volume water vapor at a space velocity of 900 Nm$^3$/m$^3$h.
**Regeneration with gas comprising 95% by volume nitrogen, 3-5% by volume oxygen and 0-2% by volume water vapor at a space velocity of 7000 Nm$^3$/m$^3$h.

From the data in this Table, it will be observed that the absorbents of zinc oxide with zeolite 5A and zeolite X have a high absorption capacity, and the regeneration rate for the absorbents according to the invention was, in general, considerably higher than the one for the other absorbents tested.

What is claimed is:

1. A process for removing hydrogen sulfide from a sour gaseous stream comprising contacting the hydrogen sulfide-containing stream with a solid absorbent comprising an intimate mixture of zinc oxide and a zeolite having a pore size larger than 0.40 nm and wherein the solid absorbent comprises more than 50 percent by weight of zinc oxide, at a temperature above 300° C.

2. The process of claim 1 in which the contacting of the H$_2$S-containing stream and the absorbent is discontinued, and the spent or partially spent absorbent is regenerated by passing an oxygen-containing gas over said absorbent at a temperature above 400° C.

3. The process of claim 2 in which the H$_2$S-containing gas is selected from off-gases from a Claus unit, synthesis gases, natural gas, and hydrocarbon process gases.

4. The process of claim 1 in which the zeolite has a pore size of at least 0.5 nm.

5. The process of claim 1 in which the zeolite has a pore size of from 0.5 nm to 1.3 nm.

6. The process of claim 4 in which the zeolite comprises the calcium form of zeolite A.

7. The process of claim 4 in which the zeolite comprises a faujasite.

8. The process of claim 4 in which the hydrogen sulfide-containing gas is passed at a temperature of from 500° C. to 550° C. over the absorbent.

9. The process of claim 8 in which spent or partially spent absorbent is regenerated at a temperature of at least 500° C.

10. The process of claim 1 in which the absorbent contains one or more oxides of a metal selected from the group comprising copper, cadmium, titanium, zirconium, vanadium, chromium, molybdenum, tungsten, manganese, iron, cobalt and nickel.

* * * * *